US011325285B2

(12) United States Patent
Toncelli et al.

(10) Patent No.: US 11,325,285 B2
(45) Date of Patent: May 10, 2022

(54) METHOD FOR MANUFACTURING CONGLOMERATE SLABS

(71) Applicant: Breton SPA, Castello di Godego (IT)

(72) Inventors: Luca Toncelli, Bassano del Grappa (IT); Angelo Luison, Castello di Godego (IT)

(73) Assignee: BRETON SPA, Castello di Godego (IT)

( * ) Notice: Subject to any disclaimer, the term of this patent is extended or adjusted under 35 U.S.C. 154(b) by 746 days.

(21) Appl. No.: 15/329,405

(22) PCT Filed: Jul. 29, 2015

(86) PCT No.: PCT/IB2015/055709
§ 371 (c)(1),
(2) Date: Jan. 26, 2017

(87) PCT Pub. No.: WO2016/016811
PCT Pub. Date: Feb. 4, 2016

(65) Prior Publication Data
US 2017/0210041 A1 Jul. 27, 2017

(30) Foreign Application Priority Data
Jul. 30, 2014 (IT) .............................. TV2014A0115

(51) Int. Cl.
*B29C 43/56* (2006.01)
*B29C 37/00* (2006.01)
*B29C 67/24* (2006.01)
*C04B 40/04* (2006.01)
*C04B 26/04* (2006.01)
*B29C 43/00* (2006.01)
*B29C 43/02* (2006.01)
*C04B 14/02* (2006.01)
*C04B 26/02* (2006.01)
*C04B 40/00* (2006.01)
*C04B 40/02* (2006.01)
*B29K 509/00* (2006.01)

(52) U.S. Cl.
CPC .......... *B29C 43/56* (2013.01); *B29C 37/0075* (2013.01); *B29C 43/003* (2013.01); *B29C 43/02* (2013.01); *B29C 67/244* (2013.01); *C04B 14/02* (2013.01); *C04B 26/02* (2013.01); *C04B 26/04* (2013.01); *C04B 40/0067* (2013.01); *C04B 40/0263* (2013.01); *C04B 40/04* (2013.01); *B29C 2043/561* (2013.01); *B29K 2509/14* (2013.01); *B29K 2911/123* (2013.01); *B29K 2995/0017* (2013.01); *B29K 2995/0063* (2013.01); *B29K 2995/0067* (2013.01); *B29K 2995/0069* (2013.01)

(58) Field of Classification Search
CPC ................ B29C 43/56; B29C 43/02
See application file for complete search history.

(56) References Cited

U.S. PATENT DOCUMENTS

| 3,023,468 | A | * | 3/1962 | Hord | ......................... B22D 7/06 164/138 |
| 3,898,114 | A | * | 8/1975 | Ward | ......................... B44C 5/04 156/90 |
| 4,112,173 | A | | 9/1978 | Roudebush et al. | |
| 4,204,820 | A | | 5/1980 | Toncelli | |
| 4,434,119 | A | | 2/1984 | Teare | |
| 5,756,214 | A | | 5/1998 | Waldon et al. | |
| 5,846,662 | A | * | 12/1998 | Baumgardner | ........... B32B 5/26 428/535 |
| 6,627,694 | B1 | | 9/2003 | Luca | |
| 2004/0169303 | A1 | | 9/2004 | Brutti | |
| 2005/0058818 | A1 | * | 3/2005 | West | ......................... B32B 5/28 428/292.1 |
| 2009/0189320 | A1 | * | 7/2009 | Bolick | .................. B29C 70/443 264/511 |
| 2009/0253829 | A1 | * | 10/2009 | Toncelli | .................. B29C 70/44 523/400 |
| 2012/0018772 | A1 | * | 1/2012 | Nishijima | ............... H01L 33/52 257/99 |
| 2012/0312469 | A1 | | 12/2012 | Steisdal | |

(Continued)

FOREIGN PATENT DOCUMENTS

EP 0786325 A1 7/1997
EP 1027205 B1 7/2002
(Continued)

OTHER PUBLICATIONS https://www.compositesworld.com/articles/mold-release-update (Year: 2005).*
Queen—https://www.soapqueen.com/bath-and-body-tutorials/cold-process-soap/how-to-line-any-mold/ (Year: 2010).*
PCT International Search Report and Written Opinion dated Nov. 24, 2015 for Intl. App. No. PCT/IB2015/055709, from which the instant application is based, 11 pgs.
Search Report and Written Opinion dated Apr. 10, 2015 for related Italian Application No. TV20140115, 8 pgs.

*Primary Examiner* — Nicholas R Krasnow
(74) *Attorney, Agent, or Firm* — Fredrikson & Byron, P.A.

(57) ABSTRACT

In the method for manufacturing conglomerate stone slabs using the Bretonstone technology, in the variant where the starting mixture is enclosed between two paper sheets, the improvement consists in replacing each paper sheet with a containment element consisting of a paper sheet, one surface of which has, applied thereon, a film of plastic material which is impermeable to organic vapours, impermeable to the liquids and in particular to the liquid resin constituting the binder of said mixture, resistant to the catalysis temperatures of the said resin and resistant to hot solvents and chemical vapours. Preferably, said plastic material is water-soluble, in particular polyvinyl alcohol.

9 Claims, No Drawings

(56) References Cited

U.S. PATENT DOCUMENTS

| | | | | |
|---|---|---|---|---|
| 2013/0171377 A1* | 7/2013 | Aravamudan | B29C 67/243 | |
| | | | | 428/15 |
| 2013/0189387 A1* | 7/2013 | Bravet | B29C 48/00 | |
| | | | | 425/89 |
| 2014/0220841 A1* | 8/2014 | Rumeau | D06M 23/12 | |
| | | | | 442/123 |
| 2015/0101509 A1* | 4/2015 | McIntyre | C08L 97/02 | |
| | | | | 106/124.1 |
| 2015/0314475 A1* | 11/2015 | Banus | B28B 1/081 | |
| | | | | 425/405.1 |
| 2020/0032458 A1* | 1/2020 | Morikawa | D21H 27/00 | |

FOREIGN PATENT DOCUMENTS

| | | | | |
|---|---|---|---|---|
| EP | 2283986 A2 | 2/2011 | | |
| WO | 2009033943 A1 | 3/2009 | | |
| WO | WO-2009147283 A1 * | 12/2009 | | C08J 7/047 |
| WO | 2010103445 A1 | 9/2010 | | |

* cited by examiner

METHOD FOR MANUFACTURING CONGLOMERATE SLABS

RELATED APPLICATIONS

This application is a 35 U.S.C. 371 national stage filing from International Application No. PCT/IB2015/055709, filed Jul. 29, 2015, which claims priority to Italian Application No. TV2014A000115, filed Jul. 30, 2014, the teachings of which are incorporated herein by reference.

The present invention relates to an improvement to the method for manufacturing conglomerate stone slabs using the Bretonstone technology and more specifically to an improvement to the temporary substrate for supporting the mixture, used in this technology.

The expression "Bretonstone technology" is understood as referring to a method and plant for manufacturing conglomerate stone slabs.

In general terms this technology envisages a first stage for preparation of a mixture consisting mainly of granules of stone material (for example marble or granite or quartz) with a predefined grain size and a binder which may be organic or inorganic. In case of inorganic binder it consists of a cement binder which has the same hardening characteristics as cement articles, while in the first case (organic binder) it consists here of a resin, preferably a styrene polyester resin, hardening of which is normally performed under hot conditions with the aid of a catalyst.

During a second stage the mixture is poured in the form of a layer with a predefined thickness onto a support which may be temporary and on which the mixture undergoes vacuum vibrocompression.

The third and final stage (irrespective of the subsequent stages involving specific machining and finishing of the resultant rough-formed slabs) consists in the aforementioned hardening operation.

It is known to produce Bretonstone slabs using the following supports for the mixture to be compacted:
(a) a bottom paper sheet onto which the mixture is poured and a top paper sheet for covering the mixture (cf. U.S. Pat. No. 4,204,820 corresponding to Italian patent application No. 85564°/77 filed on Apr. 22, 1977 and entitled: "Improvements to the method with combined vibrating and pressing action in an airless environment for forming resin-bonded granite slabs");
(b) a bottom rubber sheet, preferably in the form of a tray and a top rubber sheet (cf. Italian patent No. 1288566 and European patent No. EP 1027205).

The first process is performed by means of a less expensive plant but has not insignificant drawbacks, especially in the case of resin-based binders.

It should be remembered in fact that the catalysis step is performed in suitable ovens consisting of several heating surfaces, where the slab is enclosed between two surfaces. The temperature reached is usually about 80-140° C. so that fluidization of the resin occurs and organic vapours (in particular styrene vapours if a polyester resin is used) are generated.

Paper, since it is porous, does not form a barrier to the vapours of solvents or other chemical compounds and to migration of the resin, so that these agents pass easily through the sheet of paper and are deposited on the surfaces of the catalysis oven.

These chemical agents cause various problems:
since the styrene, when it polymerizes, becomes polystyrol, the slab adheres to the surfaces of the oven, with the result that extraction of the slab, usually performed by means of a mechanical thruster, is hindered;
entry of a new slab inside the oven, again performed by means of a mechanical thruster, is hindered;
a layer of insulating material is formed and prevents the uniform transmission of heat from the heating surfaces to the slab.

The surfaces of the oven must therefore be frequently cleaned.

This operation results in the need to interrupt operation of the plant, thus increasing the production costs. Moreover, the cleaning operation is not easy at all since the resin adheres stubbornly to the oven shelves.

In order to limit partly this problem, the idea has occurred to line the surfaces of the oven with removable plates so that cleaning of the plates may be performed outside the oven, thus avoiding in particular prolonged stoppage of the plant.

However, even with this measure, the aforementioned problems are only partly overcome, but not eliminated.

Moreover, whereas when using rubber trays the compacted and hardened slab is extracted from the tray before being sized and smoothed, in the case where paper is used, the slab, lined with paper on both sides, enters instead directly into the sizing and smoothing lines where the sizing and smoothing tools, with the aid of the cooling water, grind and reduce to a mash the sheets of paper which cover the slabs.

These operations produce a waste mixture composed principally not only of the components of the catalysed starting mixture and cooling water used to cool the tools of the sizing and smoothing machines, but also the ground paper, and therefore the mixture is substantially composed of water, powder stone material (e.g. marble or granite or quartz), bonding resin and paper.

These waste products (in the form of sludges) are decanted, filter-pressed and finally disposed of in suitable waste collection and disposal centres.

For further information regarding the possibilities for disposal of machining sludges, reference may be made to the following patent documents:
Patent Application No. PCT/EP08/61112, which relates to a method and a plant for treating and recycling machining sludges by means of drying and incineration;
Patent Application No. PCT/IB2010/50961, which relates to a method and a plant for treating the aforementioned machining sludges, in which it is envisaged adding an inorganic binder to the sludges so as to convert them into inert granules to be used in the building sector.

From the above considerations it therefore emerges that the main unresolved problems are those relating to the plants and processes based on paper elements for containing the starting mixture; the main object of the invention is therefore to provide a containment element for the mixture to be used in Bretonstone technology and therefore in the methods and the plants hitherto designed to use the top and bottom paper sheets, while eliminating however the abovementioned drawbacks and therefore preventing the aforementioned chemical agents from coming into contact with the oven shelves, so as to eliminate the need for cleaning thereof and consequent stoppage of the plant.

The invention consists in using, instead of the aforementioned top and/or bottom paper sheets, a temporary containment element for the aforementioned mixture, consisting of a composite sheet, namely a sheet of paper which has, applied on at least one of its surfaces, a film of plastic material which is impermeable both to organic vapours, in particular to styrene vapours, and to resin, while maintaining this characteristic feature also at high catalysis temperatures.

More specifically, the present invention constitutes an improvement to the method of manufacturing conglomerate slabs using the Bretonstone technology, characterized in that the temporary upper and/or lower containment element for the mixture consists of a sheet of paper or equivalent material, having the known support and resistance characteristics in relation to vibrocompression mechanical stresses, at least one of its surfaces having, applied thereon, a film of plastic material which is:

(i) impermeable to organic vapours;
(ii) impermeable to organic liquids and in particular to the liquid resin constituting the binder of said mixture;
(iii) resistant to the catalysis temperatures of said resin and
(iv) resistant to hot solvents and chemical vapours, in particular to styrene vapours.

In the preferred embodiment of the present invention the plastic material forming said film is also water-soluble, in particular at room temperature. In fact, at the end of the process for formation of the rough slab, the latter is still lined on both surfaces with the aforementioned composite sheet and is transferred for the usual sizing and smoothing operations.

It is therefore evident that, during this machining phase, the film of plastic material may form fragments and machining waste which may obstruct and block up the water cooling system for the tools of the sizing and smoothing machines with obvious problems and damage.

It is therefore important that the material of the plastic film is able to decompose or dissolve in water, especially in water at room temperature.

This problem does not exist instead for the paper part of the composite sheet, since the paper is mashed up and dispersed in the water without creating any problems.

In this case also machining sludges containing pulverized agglomerate material, dissolved plastic film and cellulose are obtained, sludges being easily decanted, filter-pressed and disposed of.

A material which has these characteristics is polyvinyl alcohol (PVA).

It should be noted that, in the case of Bretonstone technology using rubber tray moulds, such a product is also sprayed as release agent for creating a lining film on the surface of the moulds made of rubber intended to come into contact with the mixture.

In this connection reference may be made to Italian patent No. 1311857.

The plastic film preferably has a basis weight of 10-50 g/m$^2$ and a thickness of 10-50 μm.

The paper instead has a basis weight which may be in the range 70-200 g/m$^2$.

As already mentioned the film of plastic material may be applied to both the surfaces of the usual paper sheet, normally used as top and bottom sheet in the known Bretonstone technology mentioned above.

Alternatively, said film may be applied to only one of the surfaces of the paper sheet and preferably onto the outer surface, namely the surface which does not come into contact with the mixture.

In so doing, in fact, it is avoided a problem which may instead arise during the vacuum vibrocompression step, should the plastic film come into contact with the mixture. In fact, during the vacuum vibrocompression step, the combined effect of the granules of stone material present in the mixture and the simultaneous vibration causes a rubbing and therefore abrasive action on the surface immediately in contact with the mixture, i.e. the plastic film, which may be perforated or even torn, such that the desired or desirable properties of impermeability in relation to chemical agents both in the liquid state and in the vapour state are no longer guaranteed. For this reason the simple replacement of the sheet of paper with a sheet of plastic material (even if of suitable thickness) does not appear to be appropriate.

Paper, instead, because of its nature, may absorb the aforementioned frictional stresses during vacuum vibrocompression without damage or tearing.

This advantageous characteristic of paper explains and justifies its presence in the composite plastic film and paper sheet according to the present invention.

When the plastic film is realized in polyvinyl alcohol (PVA), advantageously over the film another thin sheet of paper might be applied with a basis weight of 10÷50 g/m$^2$ for protecting it from the elevated environment humidity. In fact in elevated environment humidity conditions the polyvinyl film might become sticky, with the drawback of adhering the hardened slabs between each other when arranged one on another before being sized and polished.

As regards, finally, the application of the plastic film onto the layer of paper, the customary technologies, which are well known to persons skilled in the art and employed in the manufacture of engineering laminates, such as hot-bonding or spreading, may be used. In short, the advantages which can be achieved with the present invention are as follows:

(a) the possibility of using a plant of the type which is simpler and less costly than the type which uses top and/or bottom paper sheets for containing the starting mixture, without the aforementioned drawbacks;
(b) the possibility of maintaining use of the paper sheet in the mixture containing elements (paper is a low-cost, widely available material) by combining it with a preferably water-soluble polymer film;
(c) ease of manufacture of the composite element consisting of paper sheet and plastic film applied to one of its surfaces, preferably the outer surface;
(d) guarantee of resistance of the film of plastic material in relation to aggressive chemical agents such as styrene vapours and/or encrustations, with consequent elimination of the need to clean the shelves of the catalysis oven;
(e) protection of the water cooling system of the rough-slab finishing machines (sizing and smoothing machines) against blockages and damage due to fragments of plastic film or machining waste, limited to the solution where the plastic film is water-soluble.

The practical implementation of the present invention may be subject to possible modifications and variations which are conceptually equivalent and within the competence of the person skilled in the art, in order to safeguard the advantageous aspects of the present invention.

For example, as regards the plastic film, it is preferably water-soluble, such as PVA, it being understood that any polymer or polymerizable material which gives rise to a water-soluble plastic film may be used. However, it is also possible to consider the use of a plastic film which is soluble in another solvent, in which case the rough-formed-slab, before the finishing steps, may be treated with a specific solvent for the plastic material forming the aforementioned film.

As regards the second component, namely the paper, it is possible and feasible to replace it with another material, such as a non-woven fabric, which performs the same function as the conventional layer of paper which is resistant to the stresses during vibrocompression, while the plastic film ensures the impermeability to chemical agents so as to safeguard the surfaces of the catalysis oven.

The invention claimed is:

1. A method for manufacturing conglomerate slabs comprising the steps of:
    preparing a mixture comprising granules and powders of stone material having a predetermined grain size, and an organic binder in a form of a liquid resin;
    pouring of said mixture on a support comprising upper and lower temporary containment elements;
    vibrocompression under vacuum of the mixture;
    hot hardening of the compacted mixture;
        characterized in that at least one of the upper and lower temporary containment elements of the mixture comprises a sheet of paper, at least one surface of the sheet of paper having, applied thereon, a film of plastic material which is:
            (i) impermeable to organic vapours;
            (ii) impermeable to liquids and in particular to the liquid resin constituting the organic binder of said mixture;
            (iii) resistant to catalysis temperatures of said liquid resin;
            (iv) resistant to hot solvents and chemical vapours; and
            (v) soluble in water;
        wherein the mixture lacks contact with the film of plastic material, wherein said film of plastic material comprises a further sheet of paper applied thereon, the film of plastic material being between the sheets of paper, the only plastic material for each of the at least one upper and lower temporary containment elements being between the sheets of paper; and
    sizing and smoothing a slab obtained by compacting and hardening the mixture and exposing the slab to water, whereby the film of plastic material of the at least one upper and lower temporary containment elements is solubilized in the water.

2. The method according to claim 1, wherein said film of plastic material comprises a polymer, wherein the polymer is a polyvinyl alcohol.

3. The method according to claim 1, wherein said film of plastic material has a basis weight in a range of 10 and 50 g/m² and a thickness in a range of 10 and 50 μm.

4. The method according to claim 1, wherein said sheet of paper of said containment element has a basis weight in a range of 70 and 200 g/m².

5. The method according to claim 1, wherein said containment element consists of the film of plastic material applied on a surface of one of the sheets of paper opposite to a surface intended to come into contact with the mixture.

6. The method according to claim 1, wherein said sheet of paper has a basis weight of between 10 and 50 g/m².

7. The method according to claim 1, wherein the hot hardening of the compacted mixture is performed in an oven having shelves, the at least one sheet of paper with the film of plastic material applied thereon preventing chemical agents from the mixture to come into contact with the oven shelves.

8. A method for manufacturing conglomerate slabs comprising the steps of:
    preparing a mixture comprising granules and powders of stone material having a predetermined grain size, and an organic binder in a form of a liquid resin;
    pouring of said mixture on a support comprising upper and lower temporary containment elements;
    vibrocompression under vacuum of the mixture; and
    hot hardening of the compacted mixture;
        characterized in that at least one of the upper and lower temporary containment elements of the mixture comprises a sheet of paper, at least one surface of the sheet of paper having, applied thereon, a film of plastic material which is:
            (i) impermeable to organic vapours;
            (ii) impermeable to liquids and in particular to the liquid resin constituting the organic binder of said mixture;
            (iii) resistant to catalysis temperatures of said liquid resin;
            (iv) resistant to hot solvents and chemical vapours; and
            (v) soluble in water;
        wherein the mixture lacks contact with the film of plastic material, wherein said film of plastic material comprises a further sheet of paper applied thereon, the film of plastic material being between the sheets of paper, the only plastic material for each of the at least one upper and lower temporary containment elements being protected from environmental humidity by the sheets of paper; and
    sizing and smoothing a slab obtained by compacting and hardening the mixture and exposing the slab to water, whereby the film of plastic material of the at least one upper and lower temporary containment elements is solubilized in the water.

9. A method for manufacturing conglomerate slabs comprising the steps of:
    preparing a mixture comprising granules and powders of stone material having a predetermined grain size, and an organic binder in a form of a liquid resin;
    pouring of said mixture on a support comprising upper and lower temporary containment elements;
    vibrocompression under vacuum of the mixture; and
    hot hardening of the compacted mixture;
        characterized in that at least one of the upper and lower temporary containment elements of the mixture comprises a sheet of paper, at least one surface of the sheet of paper having, applied thereon, a film of plastic material which is:
            (i) impermeable to organic vapours;
            (ii) impermeable to liquids and in particular to the liquid resin constituting the organic binder of said mixture;
            (iii) resistant to catalysis temperatures of said liquid resin;
            (iv) resistant to hot solvents and chemical vapours; and
            (v) soluble in water;
        wherein the mixture lacks contact with the film of plastic material, wherein said film of plastic material comprises a further sheet of paper applied thereon, the film of plastic material being between the sheets of paper, the only plastic material for each of the at least one upper and lower temporary containment elements only contacting paper; and
    sizing and smoothing a slab obtained by compacting and hardening the mixture and exposing the slab to water, whereby the film of plastic material of the at least one upper and lower temporary containment elements is solubilized in the water.

* * * * *